UNITED STATES PATENT OFFICE.

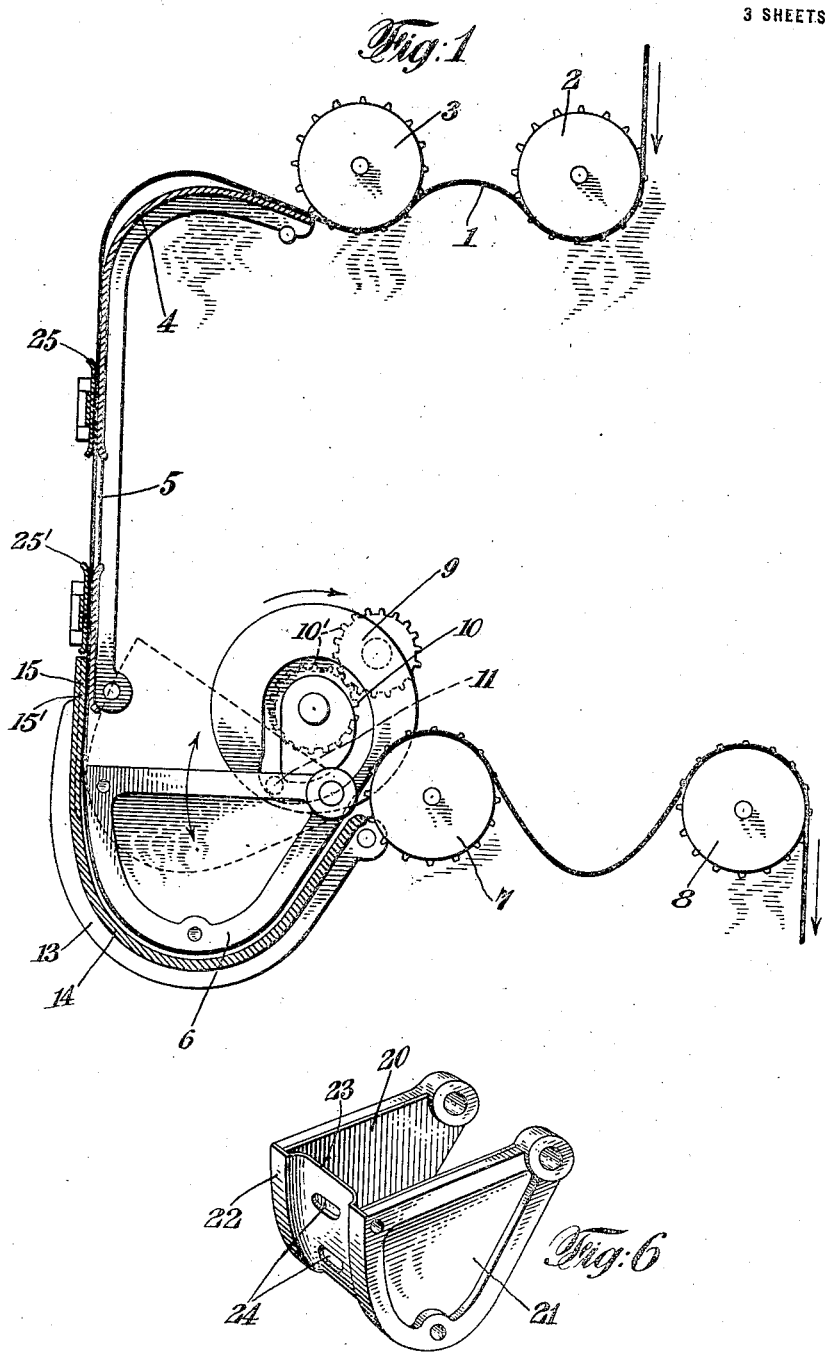

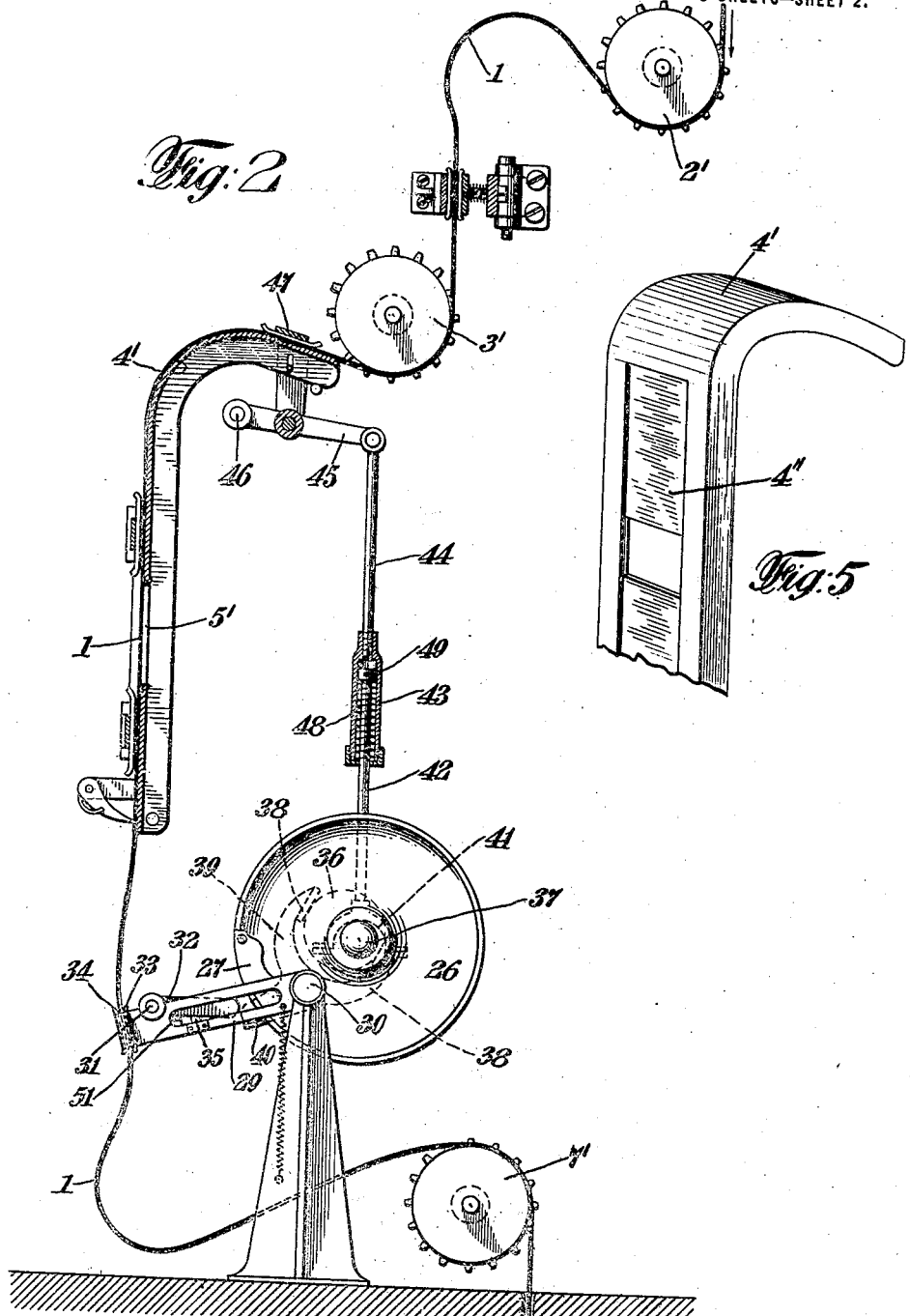

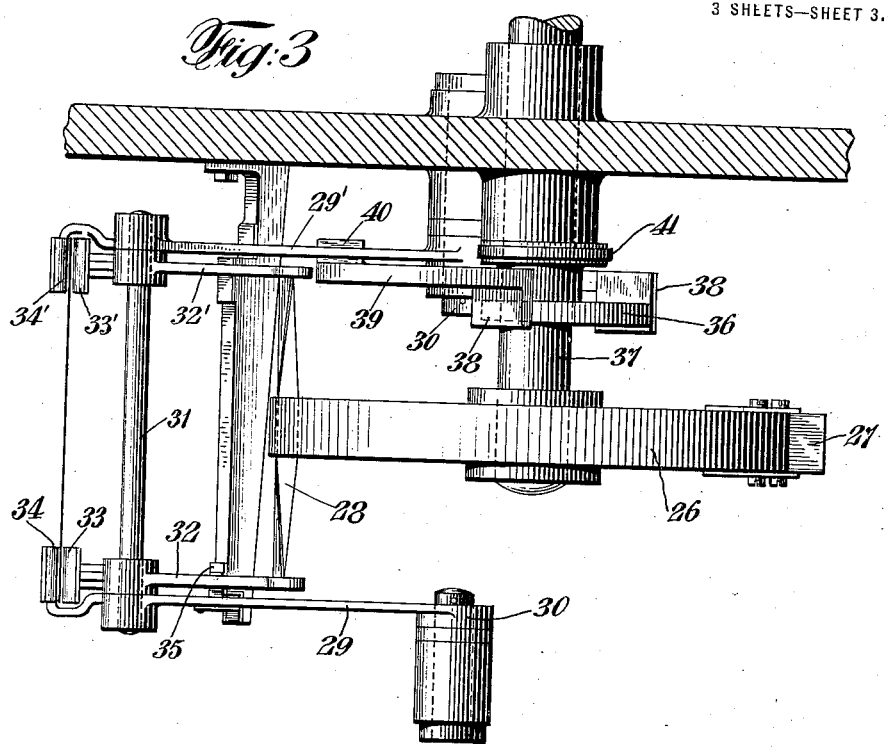
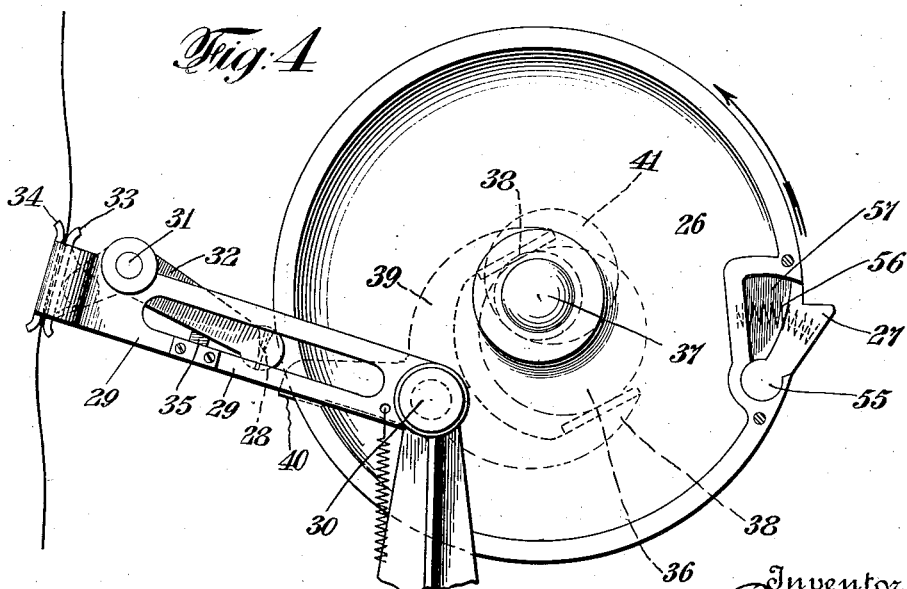

HENRY R. EVANS, OF NEW YORK, N. Y.; ADELE KEAN EVANS EXECUTRIX OF SAID HENRY R. EVANS, DECEASED.

MOTION-PICTURE APPARATUS.

1,308,984.   Specification of Letters Patent.   Patented July 8, 1919.

Application filed July 14, 1916. Serial No. 109,261.

*To all whom it may concern:*

Be it known that I, HENRY R. EVANS, a citizen of the United States, and a resident of the borough of Manhattan, city, county, and State of New York, have invented certain new and useful Improvements in Motion-Picture Apparatus, of which the following is a specification.

My invention relates to motion picture apparatus and more particularly to apparatus controlling the movements of the film past the gate in a motion picture machine.

One of the objects of the invention is to provide means whereby the film may be moved intermittently past the gate at the usual or at a much greater speed, with less wear and tear on the film.

Certain features of the invention relate to what I will term beater forms of film-feeding apparatus, and by the term "beater" I wish to be understood as including any device that moves the film intermittently by intermittently beating or gripping the film between the gate and the draw off sprocket to pass it onwardly.

My invention consists in the novel features to be hereinafter described in their preferred form, and more particularly pointed out in the appended claims. Further objects and advantages of the invention will more fully appear from the following description taken in connection with the accompanying drawings, in which—

Figure 1 is a side view of film-feeding mechanism for a motion picture machine, some parts of which are shown in section, embodying the preferred form of my invention;

Fig. 2 shows a similar view of a modification;

Figs. 3, 4 and 5 are enlarged views of details of the device shown in Fig. 2;

Fig. 6 is a detail of the beater shown in Fig. 1.

It will be seen from the drawings that the invention relates to that type of film-feeding mechanism in which a loop is formed in the film on that side of the gate or window from which the film is being fed past the gate, and in which a beater is used for moving the film intermittently past the gate. Such mechanism is commonly open to the objection that it gives rise to considerable wear of the film, and want of register of the picture with the gate. By my invention these objections are eliminated or reduced, and certain other features of advantage acquired.

In my co-pending application Serial Number 34,311, filed June 15, 1915, for motion picture apparatus, I have described film-feeding mechanism in which the film is permitted to complete its stepping movements by momentum, and more particularly by its own momentum. I have found that in some instances it may be desirable to continue a greater impelling force applied to the film toward the end of its stepping movement than is the case where the film completes its stepping movement by its own momentum alone, and one of the objects of this invention is to provide mechanism in which the beater or any desired portion thereof that engages the film, is yieldably impelled and more particularly toward the end of its film-feeding movement so that the film will be impelled during this part of its movement by a yielding force but greater than if it were impelled by its own momentum only.

In the accompanying drawings I have shown two forms of beater in each of which the beater is allowed to complete its film-feeding movement by momentum.

Referring to the drawings, Fig. 1, the film 1 passes over two feed sprockets 2, 3 which feed the film so as to form a loop therein above a curved plate 4 and in advance of the gate 5. The film continues from this loop past the gate around the bottom surface of the beater 6 having a convex surface for engaging the film, and thence over sprockets 7, 8. The sprockets 2, 3, 7, 8 may be continuous, intermittent or variable feed sprockets so long as they are so geared and driven as to form a loop in the film above the gate at the desired time and to draw off the film from the beater at the desired time and speed. The beater 6 is driven by a cam wheel 9 having a slot 10 that is engaged by a pin 11 projecting from the beater. The cam wheel is positively driven by any suitable gearing 10' and with due respect to the rotation of the sprockets 2, 3, 7, 8, as is well understood in the art, and therefore the connection is not shown. The cam slot is such as to cause the beater to reciprocate back and forth as shown by the double arrow in Fig. 1, and is further constructed, as will be understood from the drawing, so as to permit the beater to complete its film-feeding downward movement by its own momentum; that is to say, at this portion of the beater travel the cam surfaces are not engaging the pin 11 and the beater is allowed to drop by its momentum. The beater may be made of any desired weight to suit conditions, or the force of the latter part of its downward movement may be varied by any suitable means.

It is important in apparatus of this kind to have suitable means for definitely limiting the film-stepping movements; that is to say, for definitely limiting the movements of the film at each step so that the pictures will register at the gate; and for this purpose I provide, in conjunction with the yieldably impelled beater, means for limiting the stepping movements of the film. This device, in the apparatus shown in Fig. 1, takes the form of a receiver 13 which has a surface 14 that is straight in cross-section but is concave, cupped or mold-like in longitudinal section. This receiver 13 has a vertical extension in the form of a plate 15 which has its central portion slightly recessed, as indicated by the dotted line 15' in Fig. 1, for the purpose of preventing the picture portion of the film from scraping against this guide plate. The film-engaging surfaces of the receiver 13 and of the beater, are preferably of substantially the same contour in longitudinal section, so that the beater in drawing the film past the gate, forms it into a loop corresponding substantially to the contour of the film-engaging surface of the receiver or mold. When this shape takes the form of a loop one end of which is substantially in alinement with the plane of the gate, it will be seen that the bringing of the looped film into engagement with the concave receiver surface, forms a very positive stop for the film. The upward continuation 15 of the receiver 13 in the form of a vertical or nearly vertical plate, prevents the film buckling when being thus suddenly arrested. As shown in Fig. 6, the beater preferably consists of two sector-like members 20, 21 bridged at their outer ends by a film-engaging arched plate 22 offset at that portion 23 thereof that comes in alinement with the pictures of the film so as to prevent the pictures being damaged by the beater action. This plate is provided with a suitable number of ventilating perforations 24 which prevent any undue suction between the beater and the film surfaces which might otherwise tend to lift the film from the surface 14 of the receiver or mold as the beater is lifted. Not only is the surface of the beater that engages the film provided with the offset middle portion 23, but the film-engaging surface of the vertical guide plates such as 4 and 15, are so offset to prevent wear on the picture surface.

In view of the fact that the film is yieldingly impelled during the latter part of its stepping movements and is arrested by the receiver, it is not necessary to have the pressure of the pads 25—25' at the gate as great as is the usual practice, which is to have the pressure of these pads great enough to prevent the film over-running the gate by the beater action. These pads are ordinarily relied upon for registration of the film and their pressure is so great as to cause excessive wear and tear on the film. But with my invention, these pads are not wholly relied upon to arrest the film or to hold it from movement, as is usually done, but the tension is only sufficient to hold the film steady and to slightly retard the pulling action of the beater and prevent the film from moving upward when it strikes the surface of the receiver or mold 13.

It will be understood, from the apparatus shown and described, that the film is not drawn on the curved part of the plate 4 by the beater; that is to say, the loop is not drawn down upon this plate, and the plate merely serves in this instance as a guide for the film.

In the apparatus shown in Figs. 2, 3, 4 and 5, the film is fed by the sprocket 3' that is continuously, variably or intermittently driven in such manner as to form a loop above the gate 5' just over the curved portion of the plate 4' during the period of rest, and this loop, by the beater mechanism now to be described, is in this instance drawn down upon the curved plate 4', the beater completing its film-stepping movement under a yielding force, and the film is drawn off by a continuously operating draw-off sprocket 7' from a loop formed below the beater.

Referring to the beater mechanism, the cam disk 26 is arranged to engage, by means of its projection 27, with a bar 28 once in every revolution of the disk. The bar 28 forms part of a film-gripping and feeding device which is carried as a whole upon arms 29—29' pivoted at 30—30'. At their outer ends the arms 29—29' carry a pin 31 upon which are pivoted two arms 32—32' whose inner ends are connected together by the bar 28. The connection between the bar 28 and the inner ends of the arms 32—32' is made a trifle loose to evenly distribute the driving force on the two arms. At their other ends, that is to say, their outer ends, the arms 32—32' which are slightly cranked about the axis of the pin 31, carry gripping plates 33—33'. The outer ends of the arms 29—29' carry gripping plates 34—34' arranged to coöperate with the plates 33—33', as hereinafter described, for gripping and feeding the film. A light plate spring 35 (Fig. 4) presses upon the under side of the arm 32 when arms 32—32' are in such a position that the gripping plates 33—33' are gripping the film against the plates 34—34'.

An eccentric 36 mounted to rotate with the disk 26 about the axis 37, engages the jaws 38 of a lever 39 pivoted on the pin or shaft 30'. The other end 40 of this lever 39 is arranged to engage with the under side of the arm 29' when making its upward travel.

If desirable, a second eccentric 41 may be mounted to rotate with the disk 26, to operate a rod 42 which, through the medium of a telescopic joint 43, operates a second rod 44 and a lever 45 pivoted at 46 to apply intermittently an anchoring pad 47 to the film where it passes over the plate 4'. The telescopic joint referred to comprises a spring 48 engaging with the under side of a head 49 formed upon the rod 42 in such manner that when the latter is moving upward it at first permits of a slight lost motion, as will be readily seen from the drawings, and then the head 49 of the rod impinges upon the lower end of the rod 44 to lift the pad 47, while on the downward journey the pad, through this mechanism, is pressed yieldingly upon the film.

As the disk 26 is positively rotated (by any suitable mechanism not shown, and in proper coöperation with sprockets 2', 3', 7', as is well understood) the nose 27 strikes the upper edge of bar 28, thereby first causing the gripper plates 33—33' to grip the film against the plates 34—34', as is most most clearly seen in Fig. 3. In this action the arms 32—32' rotate about the center of the pin 31. This locks the arms 32—32' against further movement relatively to the arms 29—29', and these four arms and the parts supported by them therefore move together downward about the axis of pins 30—30'. Before, however, the film has been completely stepped, the nose 27 clears the bar 28 by reason of its path of movement with respect to that of the bar 28, and the rocker frame, as the arms 29—29' and the pin 31 are termed, continues its downward movement under its own momentum, together with that of the parts carried by it. This downward movement of the rocker frame and film is stopped by the film being brought down upon the curved part of plate 4' which acts as a surface to arrest the movement of the film. This surface may be utilized with or without the aid of the anchor pad 47. This curved part of the plate 4', as shown in Fig. 5, is preferably straight in cross-section so as to engage the film all the way across, although it need not be a continuous surface. However, the vertical depending portion of the plate which is always in engagement with the film, has its middle portion 4" cut away or offset to avoid the friction of the picture-bearing portion of the film with the plate, the idea being to prevent unnecessary friction of the picture-bearing portion of the film with those portions of the guide plate which the film would otherwise always be in contact with.

When the step has been completed, the lever 39 lifts the rocker frame from the position in which it is seen in Fig. 2, to that in which it is seen in Fig. 4, and it remains in this raised position until again struck downward by the nose 27, the friction at the pivots 30—30' being sufficient to hold it in its raised position. As in the case of the form of beater shown in Fig. 1, the rocker frame and its parts may be made as light or as heavy as desired to suit any particular purpose.

In order to permit the disk 26 to rotate backward without damage to the parts, the nose 27 is preferably pivoted as shown at 55, and normally kept projected outward by a spring 56 from a recess 57 provided, to receive the nose when the disk is rotated in the wrong direction, in which recess it would be forced by engagement with the lower edge of the bar 28. The anchor pad 47 is applied just before the nose 27 strikes the bar 28, and is released immediately after the step has been completed.

While I have described two specific forms of beater shown in the figures herein, it will be understood that I do not limit myself to these particular forms of mechanism for permitting the beater to complete its movement under a yielding force, and that any suitable means of impelling the beater so that it will be yieldably impelled during this portion of its movement, may be utilized.

While I have shown and described my invention with respect to two specific forms thereof, it will be obvious to those skilled in the art, after having understood my invention, that various modifications and changes may be made therein without departing from the spirit or scope of the invention, and I do not wish to be understood as limiting my invention other than as indicated in the appended claims.

Having thus described my invention, what I claim as new and desire to secure by Letters Patent, is:

1. In motion picture apparatus, the combination of a gate past which a film is fed, means for feeding the film to form a loop therein in advance of the gate, and means for feeding the film intermittently from the loop past the gate, said means including an operated film-engaging part and means operating said part so that it is yieldably impelled during the latter part of its film-feeding movements, and a film-movement-limiting device having a surface against which the film is brought by the yielding force of said film-engaging member to arrest the film so as to assist in registering it at the gate at the end of each stepping movement.

2. In motion picture apparatus, the combination of a gate past which a film is fed, means for feeding the film to form a loop therein in advance of the gate, and means for feeding the film intermittently from the loop past said gate, said means including an operated film-engaging member and mechanism for operating said member to cause it to drive the film yieldingly toward the latter part of the film-feeding movements, and a film-movement-limiting device having a surface against which the film is brought by the yielding force of said film-engaging member to arrest the film so as to assist in registering it at the gate at the end of each stepping movement.

3. In motion picture apparatus, the combination of a gate past which a film is fed, means for feeding the film to form a loop therein in advance of the gate, and means for feeding the film intermittently from the loop past said gate, said means including a beater for engaging the film to move it and means operating the beater and having provision for permitting the beater to complete its film-feeding movements by momentum, and a film-movement-limiting device having a surface against which the film is brought by the yielding force of said film-engaging member to arrest the film so as to assist in registering it at the gate at the end of each stepping movement.

4. In motion picture apparatus, the combination of a gate past which a film is fed, means for feeding the film to form a loop therein in advance of the gate, and means for feeding the film intermittently from the loop past said gate, said means including an operated film-engaging member and mechanism for operating said member to drive said member positively during a part of its film-feeding movement, and having provision for permitting said member to complete its film-feeding movements under a yielding force, and a film-movement-limiting device having a surface against which the film is brought by the yielding force of said film-engaging member to arrest the film so as to assist in registering it at the gate at the end of each stepping movement.

5. In motion picture apparatus, the combination of a gate past which a film is fed, means for feeding the film to form a loop therein in advance of the gate, means for feeding the film intermittently from the loop past said gate, said means including an operated film-engaging member having a convex film-engaging surface and mechanism for operating said member and having provision for permitting it to complete its film-feeding movements yieldably, and a film-movement-limiting device located on that side of the gate toward the yieldable film-engaging member and having a concave surface of the same general contour as the convex surface of said film-engaging member against which concave surface the film is driven by the yieldable force of the said film-engaging member to cause the film to be arrested at the end of its stepping movements to insure registration of the same at the gate.

6. In motion picture apparatus, the combination of a gate past which a film is fed, means for feeding the film to form a loop therein in advance of the gate, a beater having a convex film-engaging surface, means for operating the beater to cause it to feed the film intermittently from the loop past said gate, and a film-movement-limiting device located on that side of the gate toward the beater and having a concave surface of the same general contour as the convex surface of the beater against which concave surface the film is driven by the beater, the convex film-engaging surface of the beater being provided with means to prevent the film adhering to the beater when the beater is lifted from the concave surface.

In testimony whereof, I have signed my name to this specification.

HENRY R. EVANS.